Patented June 25, 1935

2,006,211

UNITED STATES PATENT OFFICE 2,006,211

COLORED RUBBER PRODUCTS AND PROCESS OF PRODUCING THEM

Ernst Fischer, Frankfort-on-the-Main-Hochst, Germany, assignor to General Aniline Works, Inc., New York, N. Y., a corporation of Delaware No Drawing. Application February 19, 1934, Serial No. 712,091. In Germany February 22, 1933

5 Claims. (Cl. 18—50)

The present invention relates to colored rubber products and to a process of producing them.

I have found that rubber products (which term is meant to include natural rubber as well as the synthetic products which have a constitution and properties similar to those of natural rubber, as for example polymerization products of butadiene hydrocarbons such as butadiene or isoprene) can be colored clear orange to red to violet shades having very good fastness properties by incorporating with the rubber products or mixtures containing them, prior to vulcanization, water-insoluble monoazo-dyestuffs of the general formula:

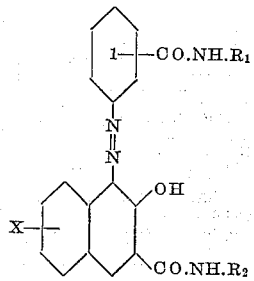

wherein the $CO.NH.R_1$-group does not stand in ortho-position to the azo group and the benzene nucleus 1 may be substituted by alkyl, alkoxy, aryloxy-groups or halogen, X stands for hydrogen, halogen or alkoxy, $R_1$ means hydrogen, an alkyl, aryl, aralkyl or hydroaromatic radical and $R_2$ an aryl radical.

By reason of the said dyestuffs being practically insoluble in rubber, they do not bleed when the rubber products are worked up; neither do they give rise to that phenomenon which is known as blushing or efflorescence when the rubber articles are stored. Furthermore, they are insoluble in benzine which renders them especially suitable also for being used in connection with cold vulcanization processes which are advantageously carried out in the presence of benzine.

Contrary to the dyestuffs known by U. S. Patent No. 1,587,004 the dyestuffs of the present application bleed much less in white rubber.

The following examples will further illustrate the nature of this invention, but the invention is not restricted to these examples. The parts are by weight:

1. A rubber mixture is prepared from 100 parts of crepe rubber, 1 part of stearic acid, 2.6 parts of sulfur, 5 parts of zinc white, 1 part of mercapto-benzothiazol, 0.2 part of hexamethylenetetramine, 60 parts of calcium carbonate, 0.6 part of ozocerite, 10 parts of lithopone, 5 parts of titanium dioxide and 1.5 parts of the monoazo-dyestuff obtainable by coupling diazotized 1-amino-2-methoxybenzene-5-(carbonylaminobenzene) with 2.3-hydroxynaphthoylaminobenzene. The mixture is vulcanized in a vulcanization press for 12 minutes at a steam pressure of 3 atmospheres above atmospheric pressure. There is obtained a clear very bluish red vulcanizate of very good fastness properties.

2. A rubber mixture is prepared in the usual manner from crepe rubber, the usual admixtures and 1.5 parts of the monoazo-dyestuff obtainable by coupling diazotized 1-amino-2-methoxybenzene-5-(carbonylaminobenzene) with 2″.3″-hydroxynaphthoyl-(4-amino-4′-methoxydiphenyl). The mixture is vulcanized by immersing it for 8 seconds in a solution of 3 parts of sulfur chloride in 97 parts of benzine. The cold vulcanizate thus obtained is, as to its tint and fastness properties, very similar to that described in Example 1.

3. A mixture is prepared from 100 parts of crepe rubber, 2.5 parts of sulfur, 0.35 part of thiuram, 5 parts of zinc white, 0.6 parts of ozocerite, 0.5 part of stearic acid and 1.5 parts of the monoazo-dyestuff obtainable by coupling diazotized 1-amino-2-methoxybenzene-5-carboxylic acid amide with 2.3 hydroxynaphthoylaminobenzene. The mass is vulcanized in an iron mould in a vulcanization press for 15 minutes at a superatmospheric pressure of 2 atmospheres. There is thus obtained a bluish red vulcanizate of very good fastness properties.

4. A rubber mixture is prepared in the usual manner from crepe rubber, the usual admixtures and 1.5 parts of the monoazo-dyestuff obtainable by coupling diazotized 1-amino-2-methoxybenzene-5-carboxylic acid-benzylamide with 2.3-hydroxynaphthoylaminobenzene. The mixture is vulcanized by immersing it for 8 seconds in a solution of 3 parts of sulfur chloride in 97 parts of benzene. The cold vulcanizate thus obtained is, as to its tint and fastness properties, very similar to that described in Example 3.

The following table illustrates a series of dyestuffs which may be substituted for those of Examples 1 to 4 and which dye the vulcanizates very fast tints.

|  | Diazo compound from | Coupled with 2',3'-hydroxynaphthoyl | Shade |
|---|---|---|---|
| 1 | 1-aminobenzene-3-carboxylic acid-amide | -1-amino-4-methoxy-benzene | Red orange. |
| 2 | 1-amino-benzene-3-carboxylic acid-cyclohexyl-amide | -1-amino-3-chlorobenzene | Orange. |
| 3 | 1-amino-benzene-3-(carbonylaminobenzene) | -aminobenzene | Do. |
| 4 | 1-amino-benzene-3-(carbonylaminobenzene) | -1-amino-2-methoxy-benzene | Do. |
| 5 | 1-aminobenzene-4-carboxylic acid-benzylamide | -aminobenzene | Do. |
| 6 | 1-aminobenzene-4-(carbonyl-1'-amino-3'-chlorobenzene) | -aminobenzene | Do. |
| 7 | 1-amino-3-methyl-benzene-4-(carbonyl-aminobenzene) | -aminobenzene | Scarlet. |
| 8 | 1-amino-4-methyl-benzene-5-(carbonyl-aminobenzene) | -aminobenzene | Red. |
| 9 | 1-amino-4-methoxy-benzene-5-carboxylic acid-amide | -1-amino-2-methoxybenzene | Do. |
| 10 | 1-amino-2-chlorobenzene-5-(carbonyl-1'-amino-2'-methyl-5'-chlorobenzene) |  | Do. |
| 11 | 1-amino-2-phenoxy-benzene-5-(carbonyl-1'-amino-2'-methyl-4'-chlorobenzene) | -aminobenzene | Do. |
| 12 | 1-amino-2-methyl-benzene-5-carboxylic acid-amide | -aminobenzene | Do. |
| 13 | 1-amino-2-methyl-benzene-5-carboxylic acid-methyl-amide | -aminobenzene | Do. |
| 14 | 1-amino-2-methyl-benzene-5-carboxylic acid-cyclohexylamide | -aminobenzene | Do. |
| 15 | 1-amino-2-methyl-benzene-5-carboxylic acid-benzylamide | -aminobenzene | Do. |
| 16 | 1-amino-2-methyl-benzene-5-(carbonylaminobenzene) | -aminobenzene | Do. |
| 17 | 1-amino-2-methyl-benzene-5-(carbonyl-1'-amino-3'.4'-dichlorobenzene) | -aminobenzene | Do. |
| 18 | 1-amino-2-methylbenzene-5-(carbonyl-aminobenzene) | -1-amino-2-ethoxybenzene | Do. |
| 19 | 1-amino-2-methylbenzene-5-(carbonyl-4'-aminodiphenyl) | -1-amino-4-methoxy-benzene | Do. |
| 20 | 1-amino-2-methyl-benzene-5-(carbonyl-aminobenzene) | -1-amino-4-bromobenzene | Do. |
| 21 | 1-amino-2-methyl-benzene-5-(carbonyl-2'-amino-naphthalene) | -2-amino-naphthalens | Do. |
| 22 | 1-amino-2-methylbenzene-5-(carbonyl-1'-amino-4'-chlorobenzene) | -1-amino-4-methoxy-naphthalene | Bluish red. |
| 23 | 1-amino-2-ethoxy-benzene-5-(carbonyl-1'-amino-4'-methoxy-benzene) | -aminobenzene | Do. |
| 24 | 1-amino-2-methoxy-benzene-5-carboxylic acid-cyclohexylamide | -aminobenzene | Red. |
| 25 | 1-amino-2-methoxy-benzene-5-carboxylic acid-cyclohexylamide | -1-amino-3-nitro-benzene | Bordeaux red. |
| 26 | 1-amino-2-methoxy-benzene-5-carboxylic acid-benzyl-amide | -1-amino-naphthalene | Do. |
| 27 | 1-amino-2-methoxy-benzene-5-(carbonyl-1'-amino-4'-methoxy-benzene) | -aminobenzene | Ruby red. |
| 28 | 1-amino-2-methoxy-benzene-5-(carbonyl-1'-amino-4'-ethoxy-benzene) | ___do___ | Do. |
| 29 | 1-amino-2-methoxy-benzene-5-(carbonyl-1'-amino-2'.4'-dimethoxybenzene) | ___do___ | Do. |
| 30 | 1-amino-2-methoxy-benzene-5-(carbonyl-1'amino-2'.5'-dimethoxybenzene) | ___do___ | Do. |
| 31 | 1-amino-2-methoxy-benzene-5-(carbonyl-1'-amino-2'.4'-dichlorobenzine) | ___do___ | Do. |
| 32 | 1-amino-2-methoxy-benzene-5-(carbonyl-1'-amino-2'.5'-dichlorobenzene) | -aminobenzene | Do. |
| 33 | 1-amino-2-methoxy-benzene-5-(carbonyl-1'-amino-3'.4'-dichlorobenzene) | -aminobenzene | Do. |
| 34 | 1-amino-2-methoxy-benzene-5-(carbonyl-1'-amino-3'-chloro-4'-methoxybenzene) | -aminobenzene | Do. |
| 35 | 1-amino-2-methoxy-benzene-5-(carbonyl-1'-amino-3'-methoxy-4'-chlorobenzene) | -aminobenzene | Red. |
| 36 | 1-amino-2-methoxy-benzene-5-(carbonyl-1'-amino-2'-methoxy-4'-chlorobenzene) | -aminobenzene | Ruby red. |
| 37 | 1-amino-2-methoxy-benzene-5-(carbonyl-1'-amino-naphthalene) | -aminobenzene | Do. |
| 38 | 1-amino-2-methoxy-benzene-5-(carbonyl-2'-amino-naphthalene) | -aminobenzene | Do. |
| 39 | 1-amino-2-methoxy-benzene-5-(carbonyl-1'-amino-2'-methoxy-benzene) | -1-amino-2-methoxy-benzene | Red. |
| 40 | 1-amino-2-methoxy-benzene-5-(carbonyl-2'-aminonaphthalene) | -1-amino-2-methyl-5-chlorobenzene | Bordeaux-red. |
| 41 | 1-amino-2-methoxy-benzene-5-(carbonyl-2'-amino-naphthalene) | -1-aminonaphthalene | Ruby red. |
| 42 | 1-amino-2-methoxy-benzene-5-(carbonyl-aminobenzene) | -2-aminonaphthalene | Do. |
| 43 | 1-amino-2-methoxy-benzene-5-(carbonyl-1'-amino-4'-methoxy-benzene) | -2-aminonaphthalene | Do. |
| 44 | 1-amino-2-methoxy-benzene-5-(carbonyl-aminobenzene) | -1-amino-2-nitro-4-methoxy-benzene | Do. |
| 45 | 1-amino-2-methoxy-benzene-5-(carbonyl-aminobenzene) | -1-amino-3-nitrobenzene | Bordeaux red. |
| 46 | 1-amino-2-methoxy-benzene-5-(carbonyl-1'-amino-3'-methyl-benzene) | -1-amino-3-nitro-benzene | Do. |
| 47 | 1-amino-2-methoxy-benzene-5-(carbonyl-1'-amino-3'-chlorobenzene) | -1-amino-3-nitro-benzene | Do. |
| 48 | 1-amino-2-methoxy-benzene-5-(carbonyl-1'-amino-3'-bromobenzene) | -1-amino-3-nitro-benzene | Do. |
| 49 | 1-amino-2-methoxy-benzene-5-(carbonyl-1'-amino-tetra-hydro-naphthalene) | -1-amino-3-nitro-benzene | Do. |
| 50 | 1-amino-2-methoxy-benzene-5-(carbonyl-1'-amino-4'-methoxy-benzene) | -1-amino-3-nitro-benzene | Do. |
| 51 | 1-amino-2-methoxy-benzene-5-(carbonyl-2'-aminonaphthalene) | -1-amino-3-nitro-benzene | Do. |
|  |  | 6'-bromo-2'.3'-hydroxy-naphthoyl- |  |
| 52 | 1-amino-2-methyl-benzene-5-(carbonyl-1'-amino-3'.4'-dichloro-benzene) | -aminobenzene | Ruby red. |
| 53 | 1-amino-2-methoxy-benzene-5-(carbonyl-aminobenzene) | -aminobenzene | Bordeaux red. |
|  |  | 6'-methoxy-2'.3'-hydroxy-naphthoyl- |  |
| 54 | 1-amino-2-methyl-benzene-5-(carbonyl-1'-amino-3'.4'-dichlorobenzene) | -aminobenzene | Red violet. |
| 55 | 1-amino-2-methoxy-benzene-5-(carbonyl-aminobenzene) | -1-amino-3-nitrobenzene | Violet. |

I claim:
1. The process of producing colored rubber products which comprises mixing a rubber prod- uct with a water-insoluble monoazo-dyestuff corresponding to the following general formula:

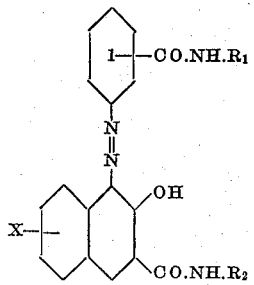

wherein the CO.NH.R$_1$-group does not stand in ortho-position to the azo group and the benzene nucleus 1 may be substituted by alkyl, alkoxy, aryloxy-groups or halogen, X stands for hydrogen, halogen or alkoxy, R$_1$ means hydrogen, an alkyl, aryl, aralkyl or hydroaromatic radical and R$_2$ an aryl radical, and then vulcanizing the mixture.

2. Colored rubber products containing a water-insoluble monoazo-dyestuff of the following general formula:

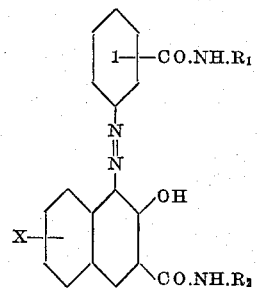

wherein the CO.NH.R$_1$-group does not stand in ortho-position to the azo-group and the benzene nucleus 1 may be substituted by alkyl, alkoxy, aryloxy-groups or halogen, X stands for hydrogen, halogen or alkoxy, R$_1$ means hydrogen, an alkyl, aryl, aralkyl or hydroaromatic radical and R$_2$ an aryl radical.

3. Colored rubber products containing a water-insoluble monoazo-dyestuff of the following formula:

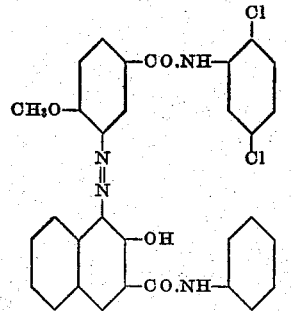

4. Colored rubber products containing a water-insoluble monoazo-dyestuff of the following formula:

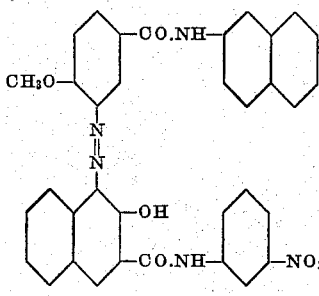

5. Colored rubber products containing a water-insoluble monoazo-dyestuff of the following formula:

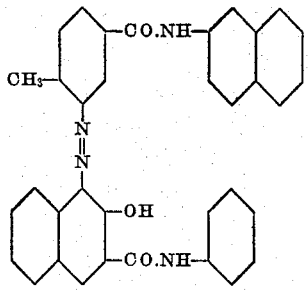

ERNST FISCHER.